United States Patent [19]

Ishihara

[11] 4,042,074
[45] Aug. 16, 1977

[54] PIN CONNECTION FOR A FLOATING TYPE DISC BRAKE

[75] Inventor: Yosuke Ishihara, Itami, Japan

[73] Assignee: Sumitomo Electric Industries, Ltd., Osaka, Japan

[21] Appl. No.: 710,046

[22] Filed: July 30, 1976

[30] Foreign Application Priority Data

Aug. 5, 1975 Japan .......................... 50-108950[U]
Apr. 3, 1976 Japan ............................ 51-41021[U]

[51] Int. Cl.² ........................................... F16D 55/224
[52] U.S. Cl. ..................................................... 188/73.3
[58] Field of Search .................... 188/71.1, 72.4, 73.3, 188/73.6; 403/13, 14

[56] References Cited

U.S. PATENT DOCUMENTS 2,935,767  5/1960  Naegeli ................................. 403/13

FOREIGN PATENT DOCUMENTS 1,523,314  3/1968  France ................................. 188/73.3
2,416,348  10/1974  Germany ........................... 188/73.6
2,510,037  11/1975  Germany ........................... 188/73.3
1,079,911  8/1967  United Kingdom ................ 188/73.3

Primary Examiner—Trygve M. Blix
Assistant Examiner—Edward R. Kazenske
Attorney, Agent, or Firm—Sughrue, Rothwell, Mion, Zinn and Macpeak

[57] ABSTRACT

A floating type disc brake is disclosed in which a head portion of each guide pin is shaped in cross section so as to have a flat side face. The flat side face abuts a protruding portion of a caliper that spans the disc portion of the mechanism. The abutment of the protruding portion and the flat side face prevents the guide pins from rotating.

2 Claims, 6 Drawing Figures

PIN CONNECTION FOR A FLOATING TYPE DISC BRAKE

BACKGROUND OF THE INVENTION

The present invention is in the field of floating type disc brakes.

Conventional floating type disc brakes include a disc member, inner and outer pads for pressing axially against said disc member, a fixed structural member for absorbing the damping torque produced on the inner and outer pads, a caliper member spanning said disc and pads, one or two pistons for exerting a force between the caliper and the inner pad to cause both pads to press against said disc, and guide pins for slidably connecting the caliper member to the fixed structural member. Typically, a spanner is used to prevent the guide pins from rotating. However this can cause a failure of dust proof boots. Additionally, there is the possibility that the guide pins will come out due to vibrations produced when the brake is operated.

SUMMARY OF THE INVENTION

It is therefore an object of the present invention to eliminate the above mentioned disadvantages relating to the guide pins. The object is accomplished by providing guide pins which have a flat side face head portion abutting a protrusion portion on the caliper member. The particular arrangement prevents the guide pins from rotating, and thereby eliminates the need for a spanner. Furthermore, since a spanner and the required additional length therefor is not needed, the overall disc brake may be made more compact. Also a cylindrical opening in the caliper coincident with the axis of the guide pin receives a cylindrical extension of the head portion of the guide pin. The latter extension has an opening therein for receiving a bolt to bolt the guide pin to the caliper. The matching of the caliper cylindrical opening and the guide pin head extension insures a proper sliding relation between the guide pin and the insertion hole in the fixed member.

DETAILED DESCRIPTION OF THE INVENTION

Figure 1:
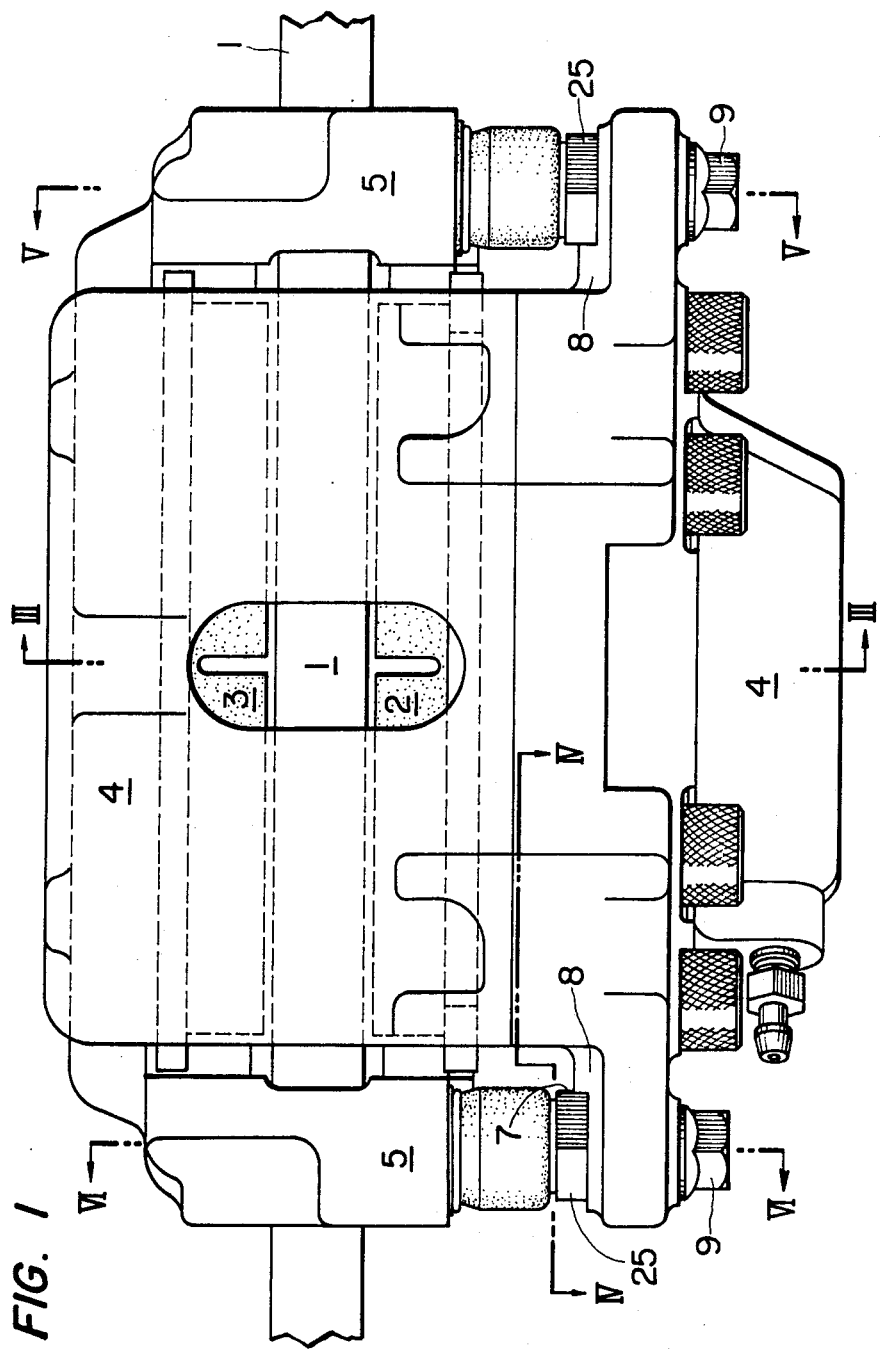
FIG. 1 is a top plan view of a preferred embodiment in accordance with the present invention.
Figure 2:
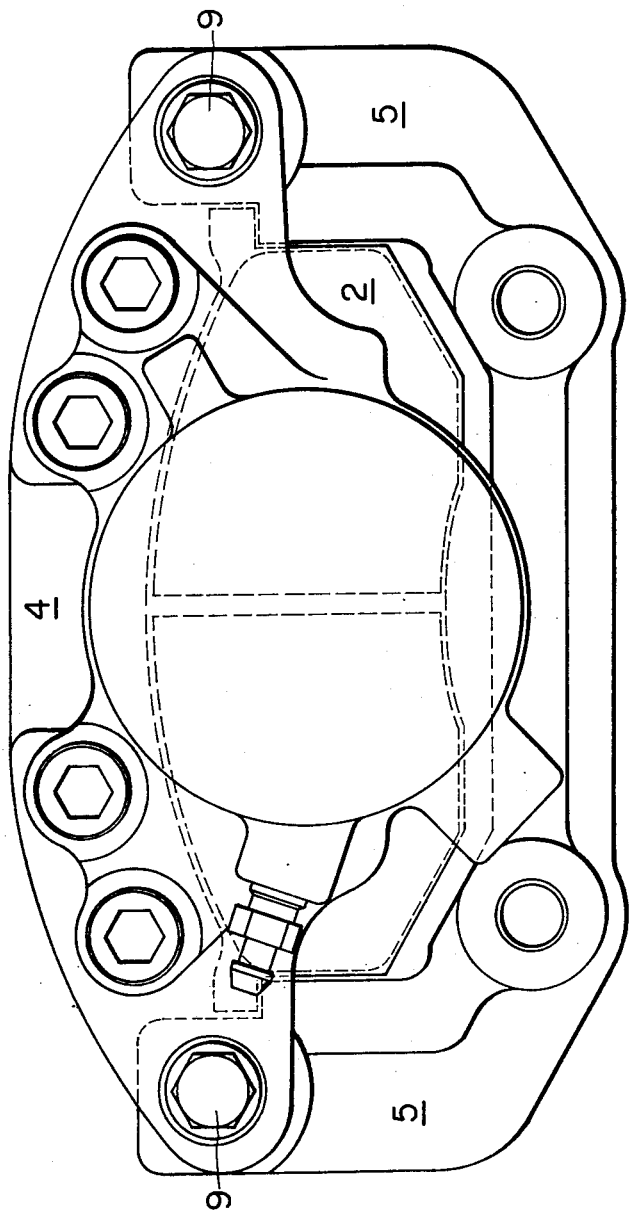
FIG. 2 is a side view of a preferred embodiment in accordance with the present invention.
Figure 3:
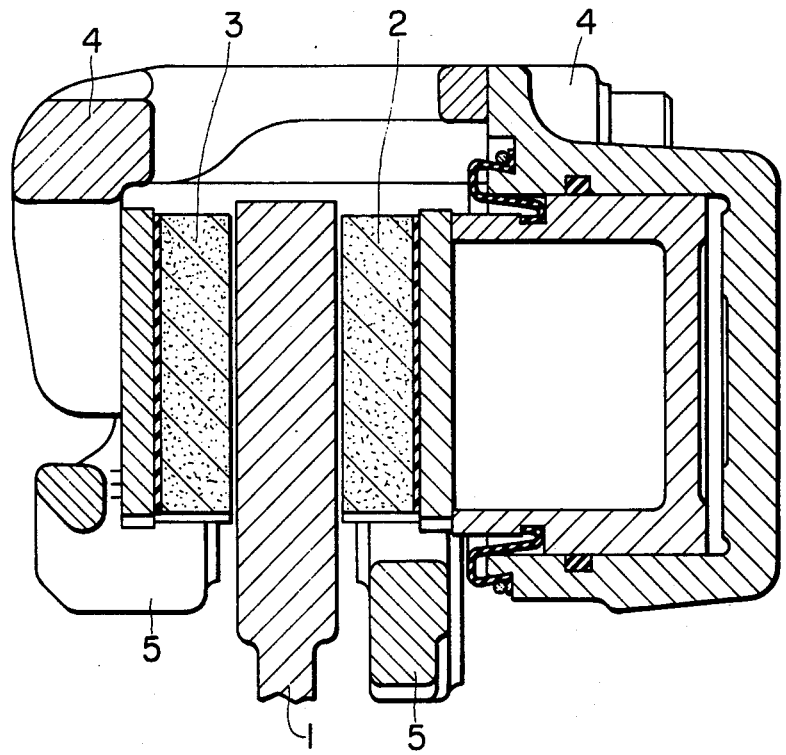
FIG. 3 is a sectional view taken along the lines III—III of FIG. 1.

Referring to FIGS. 1 to 6, there is shown a disc brake of the type in which an inner pad 2 and an outer pad 3 disposed on opposite sides of a disc 1 are guided along the side faces of a U-shaped fixed member 5 (best shown in FIG. 2). The damping torque produced on the inner and outer pads being received at the trailing side of the fixed member 5. A caliper 4 spans across both pads and the disc. A piston and cylinder, shown in FIG. 3, operate to press the inner pad 2 against the disc 1. The other end of the caliper is secured to the outer pad 3. Thus when the piston and cylinder operate the inner pad 2 is pressed against the disc 1 and the caliper is caused to slide in the axial direction of the disc thereby causing the outer pad 3 also to press against the disc. The caliper slides along the fixed member 5 under the guidance of guide pins 6.

Figure 5:
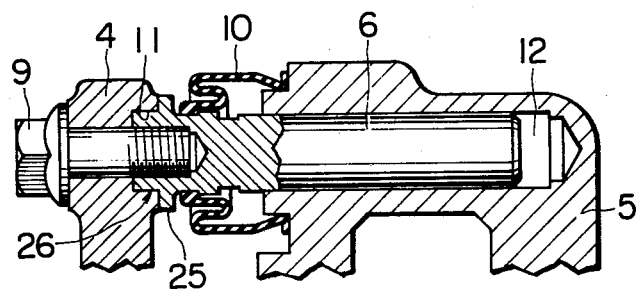
FIG. 5 is a sectional view taken along the lines V—V of FIG. 1.
Figure 6:
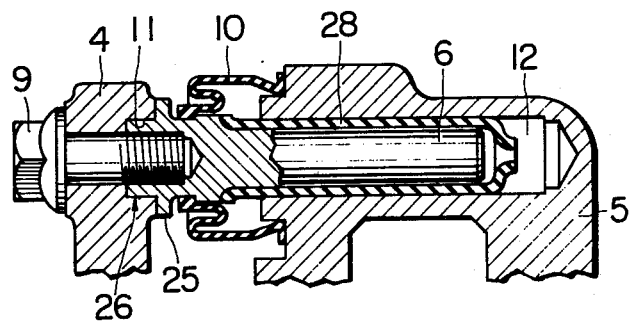
FIG. 6 is a sectional view taken along the lines VI—VI of FIG. 1.

FIG. 5 is a sectional view of the guide pin provided in the leading side of the disc, and FIG. 6 is a sectional view of the other guide pin provided in the trailing side thereof. Boots 10 are provided as shown between a part of the fixed member surrounding the opening therein and the end of the guide pin. The guide pin slides in the opening 12 of fixed member 5 when the piston moves the caliper.

Figure 4:
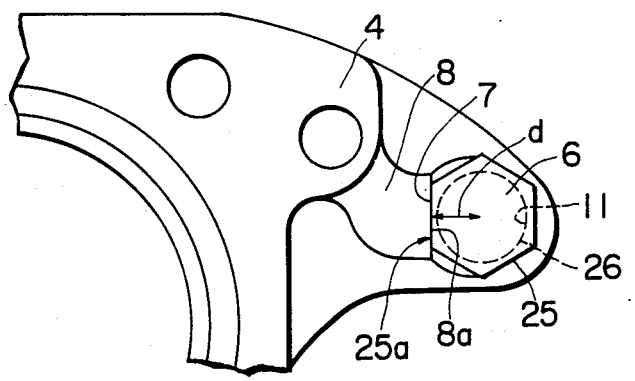
FIG. 4 is a sectional view taken along the lines IV—IV of FIG. 1.

As can be seen from FIG. 4, each of the guide pins 6 has a head portion 25 of hexagonal cross section with a cylindrical extension 26 having a smaller diameter than that of the hexagonal part. The face of the caliper at the part thereof which mates with and abuts the head of the guide pin has a molded protrusion portion 8, shown in FIGS. 1 and 4, having a flat side face 8a.

When installed, a side face 25a of the hexagonal head portion 25 abuts the flat side face 8a of the protrusion 8, thereby preventing rotation of the guide pin during operation. Furthermore, to facilitate installation and to insure a desired orientation of the guide pin during installation, the pin is formed so that the side face 25a is at a distance d from the guide pin center line, whereas all other side faces are at a slightly greater distance from the center line. The distance between the side face 8a of protrusion 8 is thus made so that the head 25 can only fit against the caliper when the pin is turned or oriented so that side faces 25a and 8a are abutting.

Furthermore the cylindrical extension 26 of the head of the guide pin fits tightly within a matching opening 11 in the caliper 4, and a bolt 9 passes through caliper 4 and into the head of the guide pin to secure the guide pin to the caliper. The cylindrical extension 26 and matching opening 11 prevents tilting of the pin 6 within the opening 12 of fixed member 5, and thereby eliminates one cause of improper sliding operation. The prevention of tilting, or stated otherwise, the prevention of shifting of the center axis of the bolt 9, is particularly important when the bolt 9 is being tightened.

It is also noted that the guide pin located on the trailing side of the disc (FIG. 6) may be covered by a bag as explained in prior U.S. Pat. application Ser. No. 677,470.

What is claimed is:

1. In a floating disc brake of the type having, a fixed member, inner and outer pads slidably guided by said fixed member into and out of pressing contact with opposite faces, respectively, of a disc to be braked, a caliper member spanning said disc and both said pads, one of said pads being mounted on one end of said caliper, piston means for acting between the other pad and the other end of said caliper member, and guide pins slidably connecting said caliper member to said fixed member, each said guide pin having a head portion secured to said caliper member and a shaft portion extending axially of said disc along said caliper in a direction away from the point at which said head portion is secured to said caliper member for sliding within a receiving opening in said fixed member, the improvement characterized by each said head portion and said caliper member in the vicinity of said head portion being matingly shaped to fit said head portion to said caliper member to prevent rotation of said guide pin, each said head portion comprising a part having a polygonal periphery with a plurality of side faces, one of said head side faces being closer to the center line of said guide pin than all the other side faces, said caliper member in the vicinity of each said head portion having a protrusion with a flat side face abutting the said one head side face to prevent rotation of said guide pin.

2. A floating disc brake as claimed in claim 1 wherein each said head portion further comprises an extension portion of cylindrical shape extending from said part having a polygonal periphery oppositely from said shaft, and wherein said caliper member in the vicinity of said head portion has a hole of substantially the same inner dimension as the outer dimension of said extension portion, said extension portion being fitted in said hole, and wherein each said guide pin is secured to said caliper member by a respective bolt having a bolt shaft which passes through said caliper member and threadably engages a hollow portion centered in said cylindrical shaped extension portion of said head portion.

* * * * *